United States Patent
Salo et al.

(10) Patent No.: US 6,456,995 B1
(45) Date of Patent: Sep. 24, 2002

(54) SYSTEM, METHOD AND COMPUTER PROGRAM PRODUCTS FOR ORDERING OBJECTS CORRESPONDING TO DATABASE OPERATIONS THAT ARE PERFORMED ON A RELATIONAL DATABASE UPON COMPLETION OF A TRANSACTION BY AN OBJECT-ORIENTED TRANSACTION SYSTEM

(75) Inventors: Timo J. Salo, Apex, NC (US); Kevin J. Williams, Redondo Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,427

(22) Filed: Dec. 31, 1998

(51) Int. Cl.[7] .............................................. G06F 17/00
(52) U.S. Cl. .................. 707/1; 707/103 Y; 707/103 Z; 707/103 R; 707/8
(58) Field of Search .............. 707/1–206; 709/313–317, 709/200; 711/100; 712/216, 208

(56) References Cited

U.S. PATENT DOCUMENTS

| | | | |
|---|---|---|---|
| 5,448,727 A | | 9/1995 | Annevelink .................. 707/101 |
| 5,832,498 A | | 11/1998 | Exertier ....................... 707/103 |
| 6,106,569 A | * | 8/2000 | Bohrer et al. ................ 709/316 |
| 6,108,664 A | * | 8/2000 | Nori et al. ................... 707/102 |
| 6,119,126 A | * | 9/2000 | Yee et al. ........................ 707/3 |
| 6,134,558 A | * | 10/2000 | Hong et al. ................. 707/101 |
| 6,182,273 B1 | * | 1/2001 | Tarumi ........................ 709/316 |

FOREIGN PATENT DOCUMENTS

| | | | |
|---|---|---|---|
| WO | 9503586 | 2/1995 | ........... G06F/15/40 |
| WO | 9634350 | 10/1996 | ........... G06F/17/30 |

OTHER PUBLICATIONS

Lee et al., "2D–CHI: A Tunable Two–Dimensional Class Hierarchy Index for Object–Oriented Databases", Computer Software and Applications Conference 2000, COMPSAC 2000. The 24th Annual International 2000, pp. 598–607.*

Chen et al., "A Pattern–based Clustering Strategy for Object-oriented Databases", Systems, Man and Cybernetics, 1996, IEEE International Conference on, vol.:2, 1996, pp. 971–976.* diNola et al., "Genetic–based spatial clustering", Fuzzy Systems, 2000, FUZZ IEEE 2000, The Ninth IEEE International Conference on, vol. 2, pp. 953–956, May 2000.*

(List continued on next page.)

*Primary Examiner*—David Jung
(74) *Attorney, Agent, or Firm*—Myers Bigel Sibley & Sajovec; Gregory M. Doudnikoff

(57) ABSTRACT

Systems, methods and computer program products automatically order database transaction by an object-oriented transaction system. The objects in the completed transaction are clustered into groups of objects to be inserted into the relational database, objects to be deleted from the relational database and objects to be updated in the relational database. The objects to be inserted into the relational database are ordered according to an insert precedence of the objects into the relational database to thereby define an insert order. The objects to be deleted from the relational database are ordered according to a delete precedence of the objects from the relational database are ordered according to a delete precedence of the objects from the relational database to thereby define a delete order. The objects to be inserted into the relational database are inserted into the relational database in the insert order. Then, the objects to be updated in the relational database are updated in an arbitrary order. Finally, the objects to be deleted from the relational database are deleted from the relational database in the delete order.

24 Claims, 7 Drawing Sheets

OTHER PUBLICATIONS

Richardson, "Oracle Corp. Oracle8", Datapro, Jul., 1998, http://163.18.14.44/datapro/50850–1.htm, 21 pages.*

Nally et al., *"Technique for Managing Enterprise Java-Beans™ Which Are the Target of Multiple Concurrent and/or Nested Transactions"*, Ser. No. __,filed Dec. 31, 1998.

Rich et al., *"Technique for Managing Associates Between Enterprise JavaBeans™ Which Are the Target of Multiple Concurrent and/or Nested Transactions"*, Ser. No. __, Filed Dec. 31, 1998.

Salo et al., *"Scalable Object–Persistence Frameworks"*, Joop, Nov./Dec. 1998, pp. 18–24.

Booch et al., *"Unified Modeling Language: UML Quick Reference for Rational Rose 4.0"*, Rational Software Corportiona, http://www.rational.com/uml/qr/uml_poster.html, Aug. 7, 1997, 5 pages.

O'Neil, *"Database Principles–Programming–Performance"*, Morgan Kaufmann Publishers, 1994, pp. 293–413.

* cited by examiner

SYSTEM, METHOD AND COMPUTER PROGRAM PRODUCTS FOR ORDERING OBJECTS CORRESPONDING TO DATABASE OPERATIONS THAT ARE PERFORMED ON A RELATIONAL DATABASE UPON COMPLETION OF A TRANSACTION BY AN OBJECT-ORIENTED TRANSACTION SYSTEM

FIELD OF THE INVENTION

This invention relates to data processing systems, methods and computer program products and more particularly to database systems, methods and computer program products.

BACKGROUND OF THE INVENTION

Relational databases are widely used to store data in data processing environments. As is well known to those having skill in the art, in a relational database, data is addressed based on its relationship to other data rather than its actual location in the database. The relationships among data in the relational database may be indicated using relationship keys. For example, each data element of an owner class may have a primary key associated therewith, and each data element of a member class may include a foreign key that points to the primary key of the data element that owns the member element. The design and operation of relational databases are well known to those having skill in the art and need not be described in detail herein.

Object-oriented programming systems, methods and computer program products are also widely used in data processing environments. As is well known to those having skill in the art, object-oriented programming systems, methods and computer program products are composed of a large number of "objects". An object is a data structure, and a set of operations or functions that can access the data structure. Objects having identical data structures and common behavior can be grouped together into, and collectively identified as, a class. In an object-oriented computing environment, the data is processed by requesting an object to perform one of its methods. Inheritance relationships also may exist between two or more classes such that a first class may be considered a parent of a second class and the second class may be considered a child of the first class. The data structure of the child class includes all of the attributes of the parent class. The design and operation of object-oriented programming systems, methods and computer program products are well known to those having skill in the art and need not be described in detail herein.

Object-oriented computing environments are now being used to form object-oriented transaction systems that can be flexible and user-friendly. As is well known to those having skill in the art, a transaction generally refers to a logical group of changes to one or more objects that are performed in an atomic manner. In other words, either all operations within the transaction are performed, or none of them are performed. By using a transactional approach, all changes to an object by a user within the scope of a transaction are made first to an internal copy of the object, without actually updating the persistent, stored object itself. The user may eventually decide whether to permanently commit the changes encompassed by the transaction, or whether to discard them. If the user chooses to commit, then the objects in persistent storage are updated. If the user chooses to discard the changes, the persistent storage is left unchanged.

Object-oriented transaction systems may be used in enterprise applications that reflect complex business processes, so that users can navigate freely between different elements of the user interface. For example, the user may wish to have multiple windows for one application open on a display at the same time. Users of such applications may expect that they can switch from processing information in one window to processing information in a different window without having to take special precautions to ensure consistency of the data between the different windows. An object-oriented transaction system is described in co-pending application Ser. No. 09/223,986 entitled "Technique for Managing Enterprise JavaBeans™ which are the Target of multiple Concurrent and/or Nested Transactions" to Nally et al., filed Dec. 3, 1998, and assigned to the assignee of the present invention, the disclosure of which is hereby incorporated herein by reference.

Relational databases generally include referential integrity constraints for maintaining consistency of the database. These constraints generally require database tore and delete operations to be executed in a specific order. Unfortunately, this order may not match the order in which objects are created, modified or deleted within an object-oriented transaction. Moreover, the database referential integrity constraints generally do not map to the logical object relationships in a consistent manner. Referential integrity constraints generally are enforced based on the key information, such as which entity is referring and which entity is being referred to with a relational foreign key. This key information may have more than one possible transformation when mapped to object relationships. Therefore, it may be difficult to deduce an order in which trees of objects need to be stored to or deleted from the relational database, based upon the application event flow or the object relationship logical directions.

Accordingly, it may be difficult to interface an object-oriented transaction system to a relational database such that database operations are properly ordered or sequenced upon completion of a transaction by the object-oriented transaction system. In order to interface an object-oriented transaction system to a relational database, while maintaining the relational database referential integrity constraints, customized coding of operation ordering may be provided in the object-oriented transaction system. However, such custom coding may be time-consuming and may consume up to 30% or more of a project's resources. See the publication entitled "Scalable Object-Persistence Frameworks", Journal of Object-Oriented Programming, November/December 1998, pages 18–24 by the present inventors and Hill. Alternatively, referential integrity constraint enforcement may be disabled in the relational database. Unfortunately, if the referential integrity constraints are disabled in the relational database, the entire relational database may become corrupted and internally inconsistent.

SUMMARY OF THE INVENTION

It is therefore an object of the present invention to provide systems, methods and computer program products that can interface an object-oriented transaction system with a relational database.

It is another object of the present invention to provide systems, methods and computer program products that can interface an object-oriented transaction system with a relational database while preserving the relational database referential integrity constraints.

These and other objects are provided, according to the present invention by systems, methods and computer program products that automatically order objects corresponding to database operations that are performed on a relational database upon completion of a transaction by an object-oriented transaction system. The objects in the completed transaction are clustered into groups of objects to be inserted into the relational database, objects to be deleted from the relational database and objects to be updated in the relational database. The objects to be inserted into the relational database are ordered according to an insert precedence of the objects into the relational database to thereby define an insert order. The objects to be deleted from the relational database are ordered according to a delete precedence of the objects from the relational database to thereby define a delete order. The objects to be inserted into the relational database are inserted into the relational database in the insert order. Then, the objects to be updated in the relational database are updated in an arbitrary order. Finally, the objects to be deleted from the relational database are deleted from the relational database in the delete order.

The precedences between different database operations form complex prerequisite trees. However, it has been found according to the present invention, that these prerequisites need not be completely resolved in order to be able to determine the correct order for operation execution. Rather, the prerequisites need only be resolved among the insert operations and among the delete operations, but not across different operation types. The operations can then be executed in three phases: first the insert operations, then the update operations and last, the delete operations.

According to another aspect of the present invention, the same operations may be used to resolve the precedences for insert and update operations. For example, to order the objects to be deleted from the relational database, associations among the objects to be deleted are identified. A current object to be deleted is defined and it is determined if the current object to be deleted has delete precedence over an associated object to be deleted. The current object to be deleted is ordered ahead of the associated object to be deleted if the current object to be deleted has delete precedence over the associated object to be deleted. The current object to be deleted is deleted behind the associated object to be deleted if the current object to be deleted does not have delete precedence over the associated object to be deleted. These operations may be repeatedly performed for remaining objects associated with the current object to be deleted. These operations also may be recursively performed for each object that is associated with the current object to be deleted that is ordered ahead of the associated object to be deleted.

Associations among the objects to be deleted may be identified by identifying current and associated objects in the objects to be deleted, identifying foreign keys and primary keys in the objects to be deleted and identifying constraints in the relational database between pairs of foreign keys and primary keys. Delete precedence may be determined by determining if a foreign key of the current object to be deleted refers to a primary key of an associated object to be deleted. If there is a constraint identified between the foreign key of the current object to be deleted and the primary key of the associated object to be deleted, then the current object to be deleted has delete precedence over the associated object to be deleted. In contrast, if no constraints are identified between the foreign key of the current object to be deleted and the primary key of the associated object to be deleted, then the current object to be deleted does not have delete precedence over the associated object to be deleted. The same operations may be performed for objects to be inserted.

Upon completion of these operations, the order of insert and delete operations to be performed on the relational database automatically corresponds to the referential integrity constraints for the relational database. Accordingly, upon completion of a transaction by an object-oriented transaction system, database operations are automatically performed on a relational database in an order that will maintain the relational database referential integrity constraints. Custom coding of operation ordering for each specific application need not be provided, and the database need not be corrupted by the sequence of operations that were performed by the object-oriented transaction system during a transaction.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
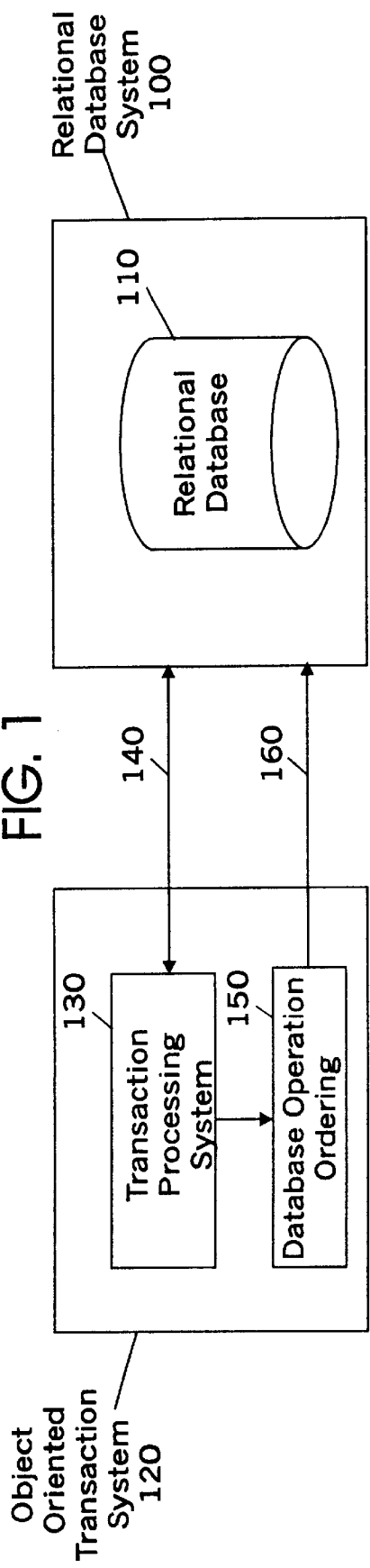
FIG. 1 is a block diagram of systems, methods and computer program products for ordering database operations that are performed on a relational database upon completion of a transaction by an object-oriented transaction system according to the invention.

Referring now to FIG. 1, systems, methods and computer program products for ordering database operations that are performed on a relational database upon completion of a transaction by an object-oriented transaction system according to the invention are illustrated. As shown in FIG. 1, a relational database system 100 includes a relational database 110. The relational database system 100 may include one or more mainframe, midrange and/or personal computers and the relational database 110 may be a single relational database or multiple relational databases that reside on one or more data processors. Example relational databases include the DB2 and SQL computer program products of IBM Corp., the assignee of the present invention.

Still referring to FIG. 1, an object-oriented transaction system 120 also can execute on one or more data processing systems including one or more mainframe, midrange and/or personal computers. The object-oriented transaction system 120 includes a transaction processing system 130 that is used by one or more users to perform a transaction. The transaction processing system 130 may include appropriate user interfaces such as graphical user interfaces, to allow flexible transactions to be performed. The design of an object-oriented transaction processing system 130 is well known to those having skill in the art and need not be described further herein.

As also shown in FIG. 1, the transaction processing system 130 interfaces with the relational database system 100 over an interface 140. Since the relational database system 100 and the transaction processing system 130 may execute on different, overlapping or the same data processing system(s), the communication network 140 may include wired and wireless communication networks, local area networks, the Internet, buses that connect two or more computers, application interfaces that connect two or more applications in a single computer and combinations thereof.

Still referring to FIG. 1, the object-oriented transaction system 120 also includes a database operation ordering system, method and/or computer program product 150. Database operation ordering 150 orders database operations that are performed on the relational database 110 upon completion of a transaction by the object-oriented transaction processing system 130. It will be understood that database operation ordering 150 may reside on one or more mainframe, midrange and/or personal computers that are different, overlapping or the same as the transaction processing system 130 and the relational database system 100. Database operation ordering 150 communicates with the relational database 110 using a second interface 160. The second interface 160 may be different, overlapping or the same interface as the first interface 140 and may include wired and wireless communication networks, local area networks, the Internet, buses that connect two or more data processors, application interfaces and combinations thereof.

The database operation ordering 150 may be embodied as methods, systems (apparatus) and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 2:
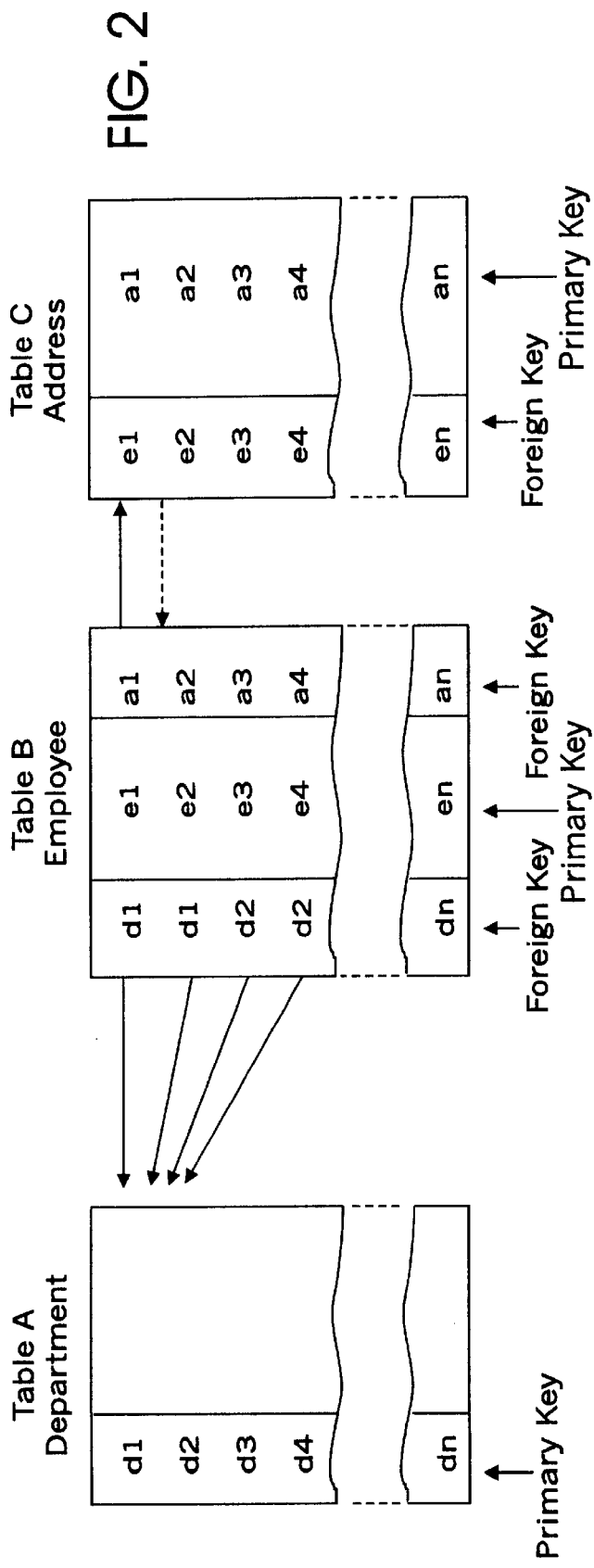
FIG. 2 illustrates relationships in a relational database.

FIG. 2 illustrates relationships in a conventional relational database. For ease of illustration, the relational database is assumed to include three tables denoted Table A, Table B and Table C. Moreover, in order to provide a specific example, it will be assumed that Table A includes a listing of departments in an organization, Table B includes a list of employees in an organization and Table C includes a list of employee addresses in an organization. It will be understood that relational databases may be represented using techniques other than tables. It will also be understood that relational databases generally include many more tables and data entries than are illustrated in FIG. 2.

As shown in FIG. 2, the department Table A includes departments d1–dn. The employee Table B includes employees e1–en, and the address Table C includes addresses a1–an. The relationship between department Table A to employee Table B is an "owner-member" relationship. Since the relationship between departments and employees is one to many, the department Table A includes a primary key and the employee Table B includes a foreign key that refers to the appropriate primary key of department Table A. Stated differently, the relationship between Table A and Table B is owner to member so that the foreign key in the member table refers to the appropriate primary key in the owner table. In contrast, the relationship between employee Table B and address Table C is one to one so that the relationship may be defined using a foreign key in the employee Table B that refers to the address Table C as shown by a solid arrow, or a foreign key in the address Table C that refers to the employee Table B as shown by the dotted arrow.

Relational databases generally include referential integrity constraints for maintaining the consistency of the database. These constraints generally require database store and delete operations to be executed in a specific order or sequence. For example, a referential constraint for FIG. 2 might be that an employee cannot be added unless the employee's department is already present. Conversely, a department cannot be deleted until all its employees have been deleted or updated to refer to another department.

Figure 3:
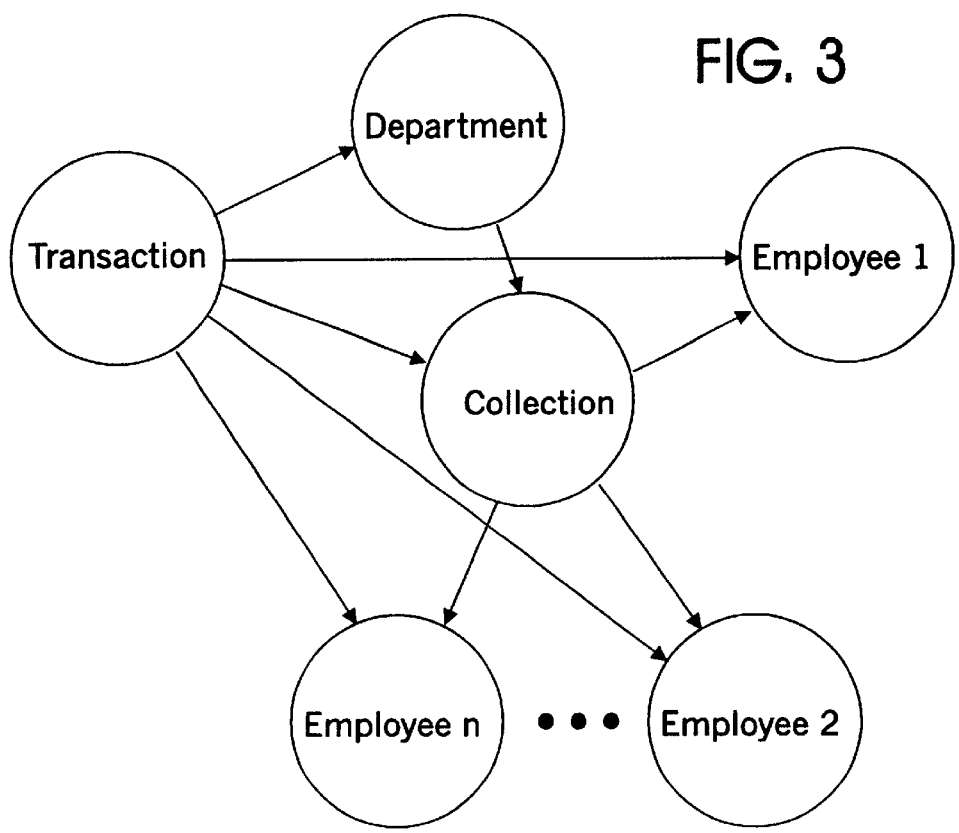
FIG. 3 illustrates logical object associations in an object-oriented transaction.

Unfortunately, these orders of operations do not necessarily match to the order in which objects are created or deleted within an object-oriented transaction processing system 130. For example, referring to FIG. 3, an object-oriented transaction processing system may include a transaction object that refers to a department object that refers to a collection object that refers to a group of employee objects, all of which are affected during a transaction. Comparing FIG. 3 to FIG. 2, the objects, pointers and directions of pointers generally are different.

The database referential integrity constraints do not generally map to the logical parent-child object relationships in a consistent manner, because referential integrity rules are generally enforced based on the key information and not based on logical relationships. For example, association pointing from employee to address may be implemented in the database as a foreign key reference from employee to address or from address to employee. Furthermore, the relationships between objects generally are independent of the order in which the objects are stored to or deleted from the database. Therefore, the order in which trees of objects need to be stored to or deleted from the relational database generally cannot be deduced either from the event flow in the transaction processing system 130, or from the object relationship logical directions.

Accordingly, at the end of an object-oriented transaction by transaction processing system 130, the objects generally are known, the operations that were performed are generally known and the data that results is generally known. However, the order or sequence in which changes should be made to the relational database 110 in order to preserve the referential integrity constraints are not known.

There are generally three kinds of relational operations that can be performed on persistent objects: insert, update and delete. The dependency between these operation types are generally as follows:

(1) Insert operations can be dependent on other inserts, but not on any other kind of operations. For example, data to be inserted can refer to other data to be inserted.
(2) Update operations are not dependent upon other updates, but they can be dependent on inserts. For example, data is to be updated to refer to data to be inserted.
(3) Delete operations can be dependent upon other deletes. For example, data to be deleted refers to other data to be deleted. Delete operations also can be dependent on updates. For examples, data is to be updated to de-reference data to be deleted.

When inserting data for the objects, the data being referred must be inserted before the referring data. When updating data, the data being referred must be inserted before updating the referring data. When deleting data, the referring data must either be deleted or updated to de-reference the referenced data, before deleting the referenced data.

The precedences between different database operations form complex trees of prerequisites. Due to the nature of relational referential integrity constraints, there generally are no circular constraints defined in the database.

Database operation ordering 150 according to the present invention provides a mechanism for automatically ordering the relational insert and delete operations according to the referential integrity constraints defined for the relational database 110 when trees of objects are to be stored to or deleted from the database. The ordering mechanism preferably utilizes the information of how the relationships between the objects are mapped to the primary-key/foreign-key pairs in the database and integrity rules for the pairs.

FIGS. 4–8 are flowcharts that illustrate database operation ordering according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 4:
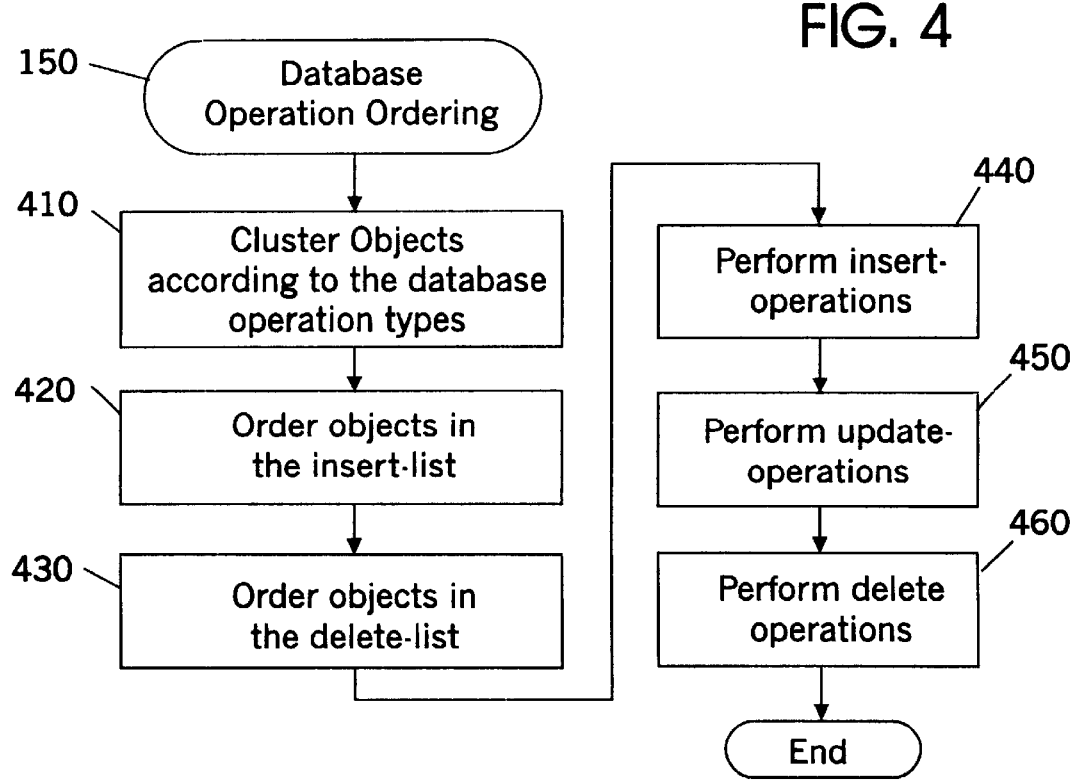
FIGS. 4–8 are flowcharts illustrating database operation ordering according to the present invention.

Referring to FIG. 4, it has been realized, according to the invention, that prerequisites do not need to be resolved completely in order to be able to determine a proper order for operation execution in the relational database. Rather, the prerequisites need to be resolved in detail only among the insert operations and among the delete operations. The prerequisites need not be resolved in detail across different operation types. Accordingly, as shown in FIG. 4, database operation ordering 150 begins by clustering the objects in the completed transaction into groups of objects to be inserted into the relational database, objects to be deleted from the relational database and objects to be updated in the relational database, at Block 410. Detailed operations for clustering will be described below.

Still referring to FIG. 4, the objects to be inserted into the relational database are ordered according to an insert precedence of the objects into the relational database to thereby define an insert order in an insert-list at Block 420. At Block 430, the objects to be deleted from the relational database are ordered according to a delete precedence of the objects from the relational database to thereby define a delete order in a delete-list. It will be understood that the operations of Blocks 420 and 430 may be performed in a reverse sequence from that shown. Details of performing these operations will be described below.

Still referring to FIG. 4, the relational database operations can then be executed in three phases. First, the insert operations are performed at Block 440 by inserting into the relational database, the objects to be inserted into the relational database, in the insert order. Then, at Block 450, update operations are performed by updating the relational database with the objects to be updated in the relational database. Finally, at Block 460, delete operations are performed by deleting from the relational database, the objects to be deleted from the relational database, in the delete order.

As shown in FIG. 4, it is safe to execute the update operations after executing the insert operations, because all the objects that possibly could be referred to by the updated objects have already been inserted into the relational database. The delete operations can be executed after the update operations, because any possible de-referencing would have taken place during the update phase.

Figure 5:
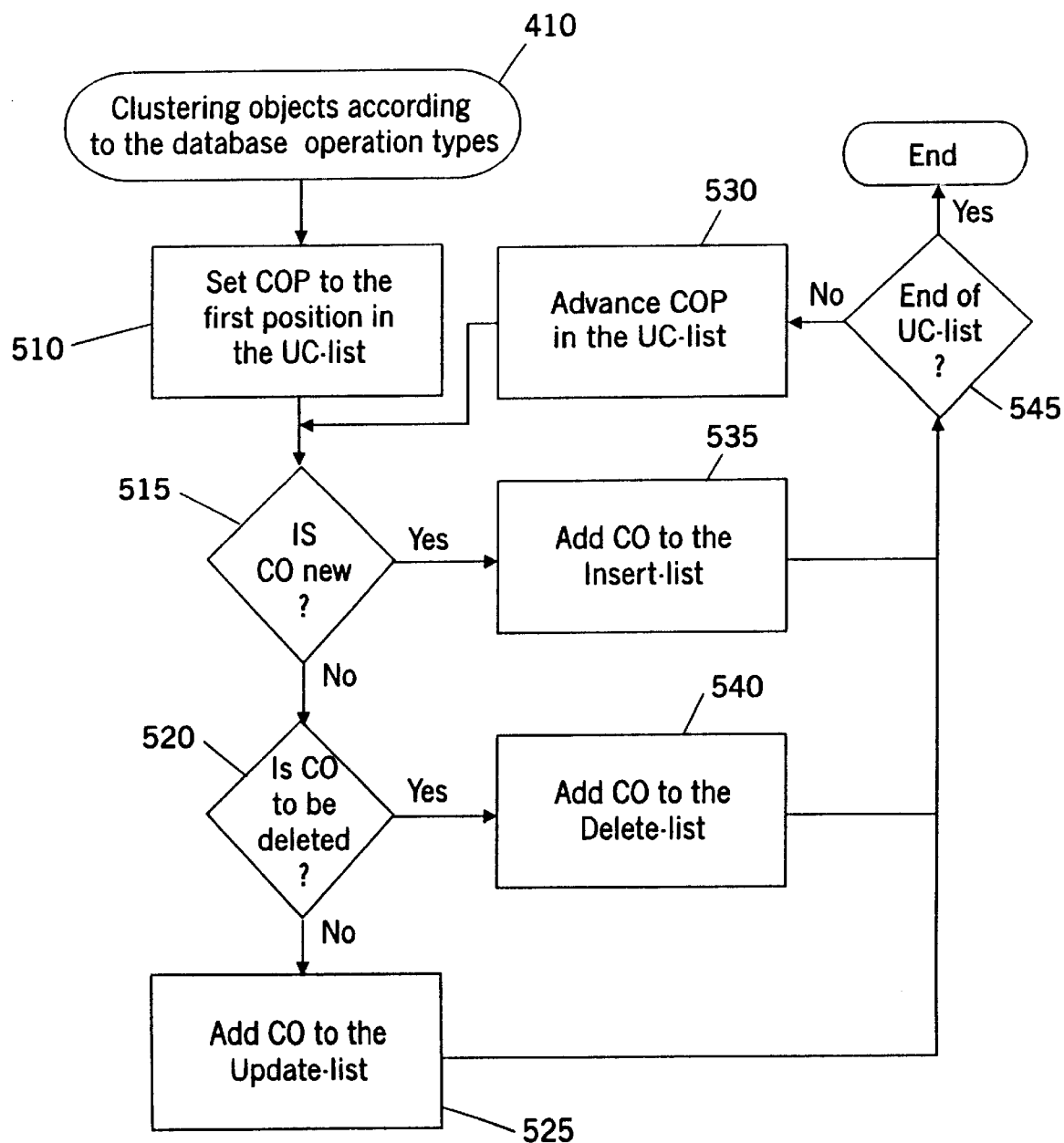

FIG. 5 illustrates clustering of objects according to the database operation types (Block 410 of FIG. 4). These operations are performed on an unclustered object list, referred to herein as a UC-list, using a Current Object Pointer referred to herein as a "COP", that points to a current object referred to herein as a "CO".

As shown in FIG. 5 at Block 510, the COP is set to the first position in the unclustered object list. A test is made at Block 515 as whether the CO is new. If yes, then the CO is added to an insert-list at Block 535. If not, a test is made at Block 520 as to whether the CO is to be deleted. If yes, then the CO is added to a delete-list at Block 540. If not, the CO is added to the update-list at Block 525. These operations are repeatedly performed until the end of the unclustered object list is reached at Block 545. Once the end of the unclustered object list is reached, the insert-list has been populated with the objects to be inserted into the relational database, the delete-list has been populated with the objects to be deleted from the database, and the update-list has been populated with the objects to be updated in the relational database.

The same operations can be performed for resolving the detailed prerequisites for insert and update operations. Accordingly, these operations are described generically in FIG. 6. However, it will be understood that these operations are performed separately for ordering the objects to be inserted into the relational database according to an insert precedent of the objects into the relational database to thereby define an insert order, and separately for ordering the objects to be deleted from the relational database according to a delete precedence of the object from the relational database to thereby define a delete order.

It will also be understood that ordering the objects to be inserted may be performed prior to ordering the objects to be deleted. Alternatively, ordering the objects to be deleted maybe performed prior to ordering the objects to be inserted. Moreover, ordering the objects to be inserted may be performed simultaneously with ordering the objects to be deleted in two independent processes.

Finally, it will be understood that ordering of objects to be updated in the relational database need not be performed. Stated differently, the objects to be updated in the relational database may be updated in an arbitrary order. Ordering is not required because it is safe to execute the update operations in any arbitrary order after executing the insert operations, because all the objects that possibly could be referred by the updated objects have already been inserted in the relational database.

Figure 6:
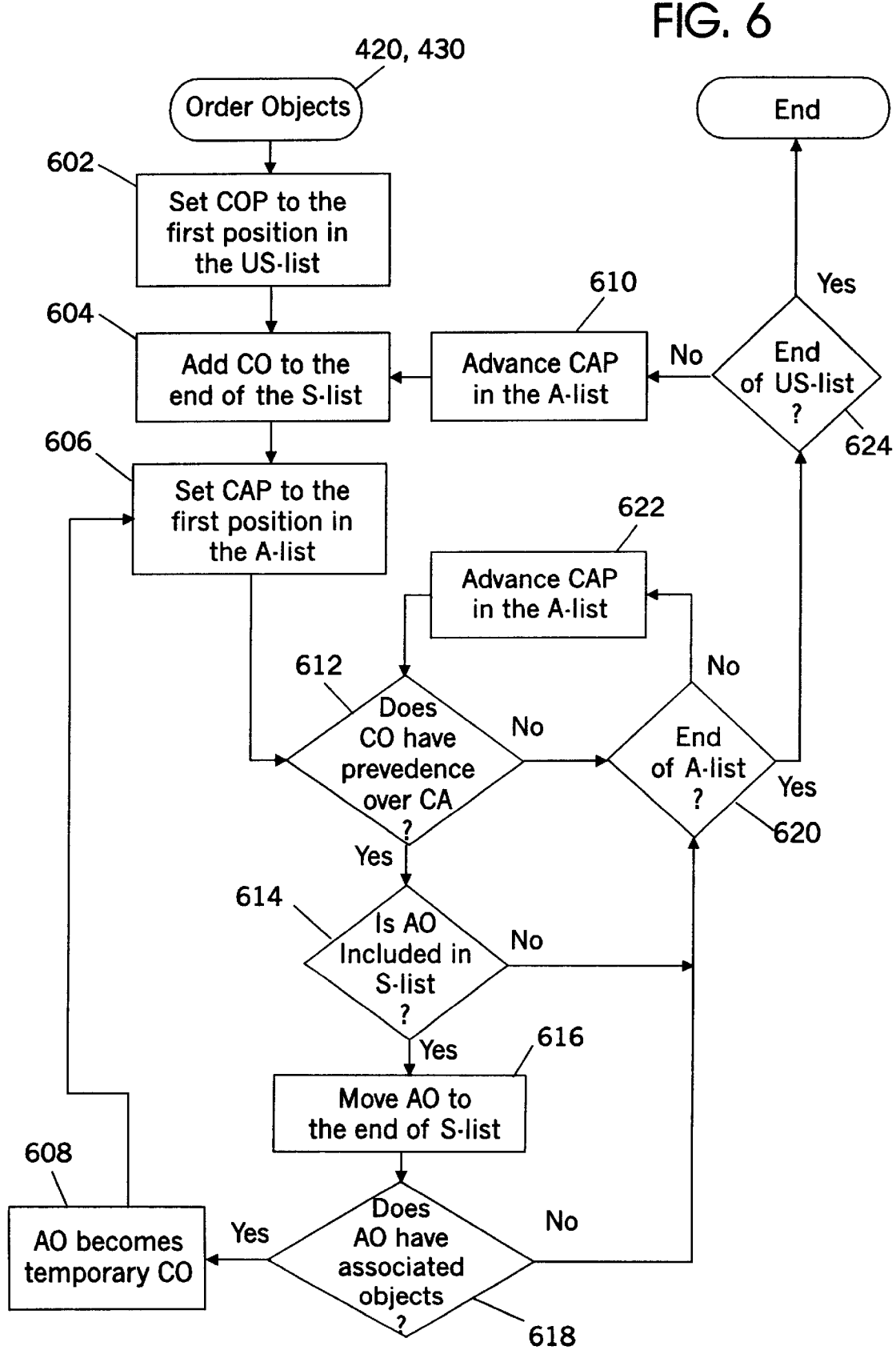
Figure 9:
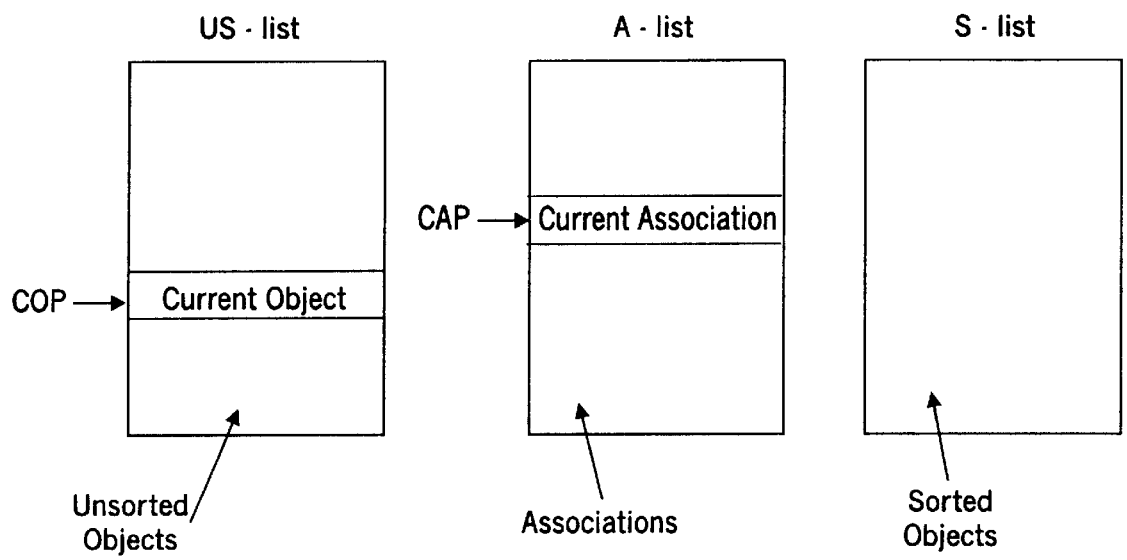
FIG. 9 illustrates lists of objects according to the present invention.
Figure 10:
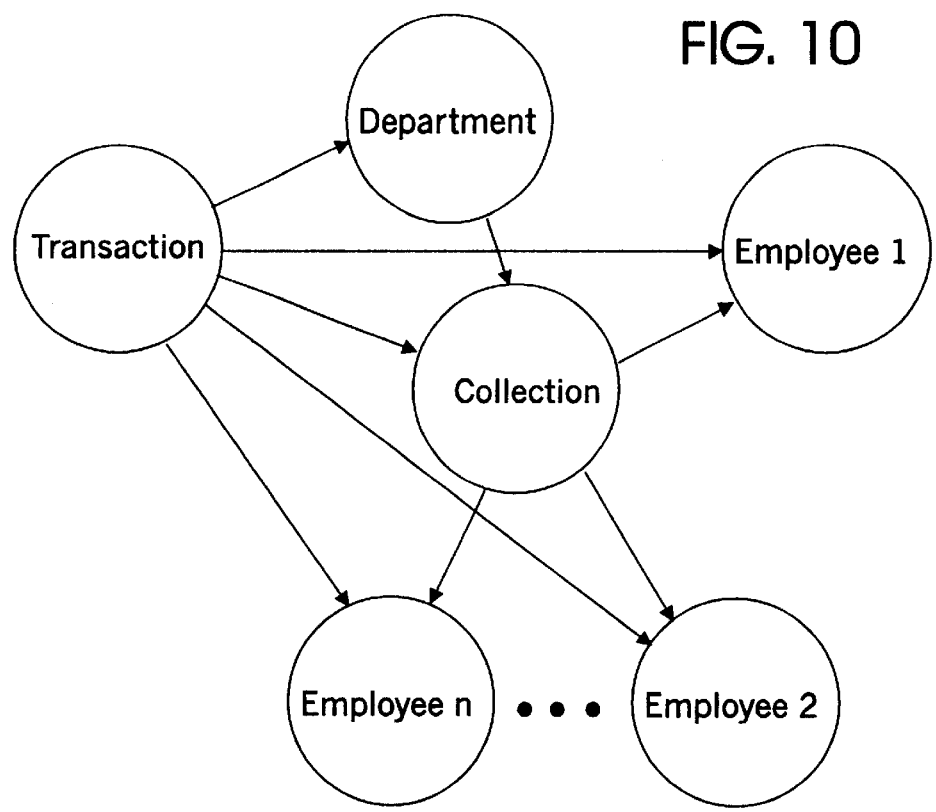
FIG. 10 illustrates example associations for the object-oriented transaction of FIG. 3.

Referring to FIG. 9, the operations of FIG. 6 use two lists of objects that participate in the transaction: a list of unsorted objects referred to as an unsorted object list or a "US-list", and a list of sorted objects referred to as a sorted object list or an "S-list". The sorted object list is initially empty and the unsorted object list initially contains all of the objects to be inserted in the relational database or all of the objects to be deleted from the relational database. The operations for ordering objects operate on a Current Object (CO) in the unsorted object list using a Current Object Pointer (COP).

Still referring to FIG. 9, an associations list or "A-list" includes a listing of associations from the Current Object to its associated objects. A Current Association Pointer (CAP) points to a Current Association (CA).

The concept of associations between objects, in general, is well known in the art. An association may also be thought of as a relationship; in fact, while the term "association" is commonly used in object modeling when designing applications that will use objects, the term "relationship" is used in data modeling when discussing how the data is stored in a database. One technique for object modeling is the Unified Modeling Language ("UML"), which defines a notation that can be used to diagrammatically represent associations between objects. UML is a standard of the Object Management Group, and is described in "UML Toolkit", H. Eriksson, M. Penker (published by John Wiley and Sons, 1997).

According to the UML model, an association model is composed of associations, which are known by a name and contain one or more association ends. An association end has the following properties: a type, which specifies the class to which this end of the association refers; a role name, which is unique for all of the association ends which refer to a class; and a multiplicity, which defines the number of members in the association end. Associations are further described in application Ser. No. 09/224,535, filed Dec. 31, 1998, entitled "Technique for Managing Associations Between Enterprise JavaBeans™ Which Are the Target of Multiple Concurrent and/or Nested Transactions" to Rich et al., and assigned to the assignee of the present invention, the disclosure of which is hereby incorporated herein by reference.

Referring again to FIG. 6, ordering of objects is performed by iterating the objects over the unsorted object list. Thus, Block 602 sets the Current Object Pointer (COP) to the first position in the US-list so that the first position in the US-list becomes the Current Object (CO). The Current Object also is added to the end of the S-list at Block 604. The operations then iterate over the associations that the Current Object has with other objects. Thus, at Block 606 the Current Association Pointer (CAP) is set to the first position in the A-list. For each association, the operations test if the Current Object has either insert precedence (if the object is to be inserted into the database) or delete precedence (if the object is to be deleted from the database) over the Current Association at Block 612. If the Current Object has precedence over the Current Association and the Associated Object or objects are already included in the S-list in a position before the Current Object (Block 614), then the Associated Object and its lower precedence Associated Objects are recursively moved to the end of the S-list of Block 616.

At Block 618 if the Associated Object includes other Associated Objects, then the Associated Object becomes the temporary Current Object at Block 608 and the precedence testing and moving Associated Objects to the end of the S-list are performed recursively. When all Associated Objects have been tested at Block 618 and the end of the A-list is not reached at Block 620, then the CAP is advanced in the A-list at Block 622 and the recursive operations are again performed. At the end of the A-list at Block 620, the COP is advanced in the US-list by one increment at Block 610 if the end of the US-list has not yet been reached at Block 624. Accordingly, upon completion of the processing of FIG. 6, the order of either insert or delete operations to be performed for the objects in the clustered list corresponds to the referential integrity rules defined in the relational database.

Figure 7:
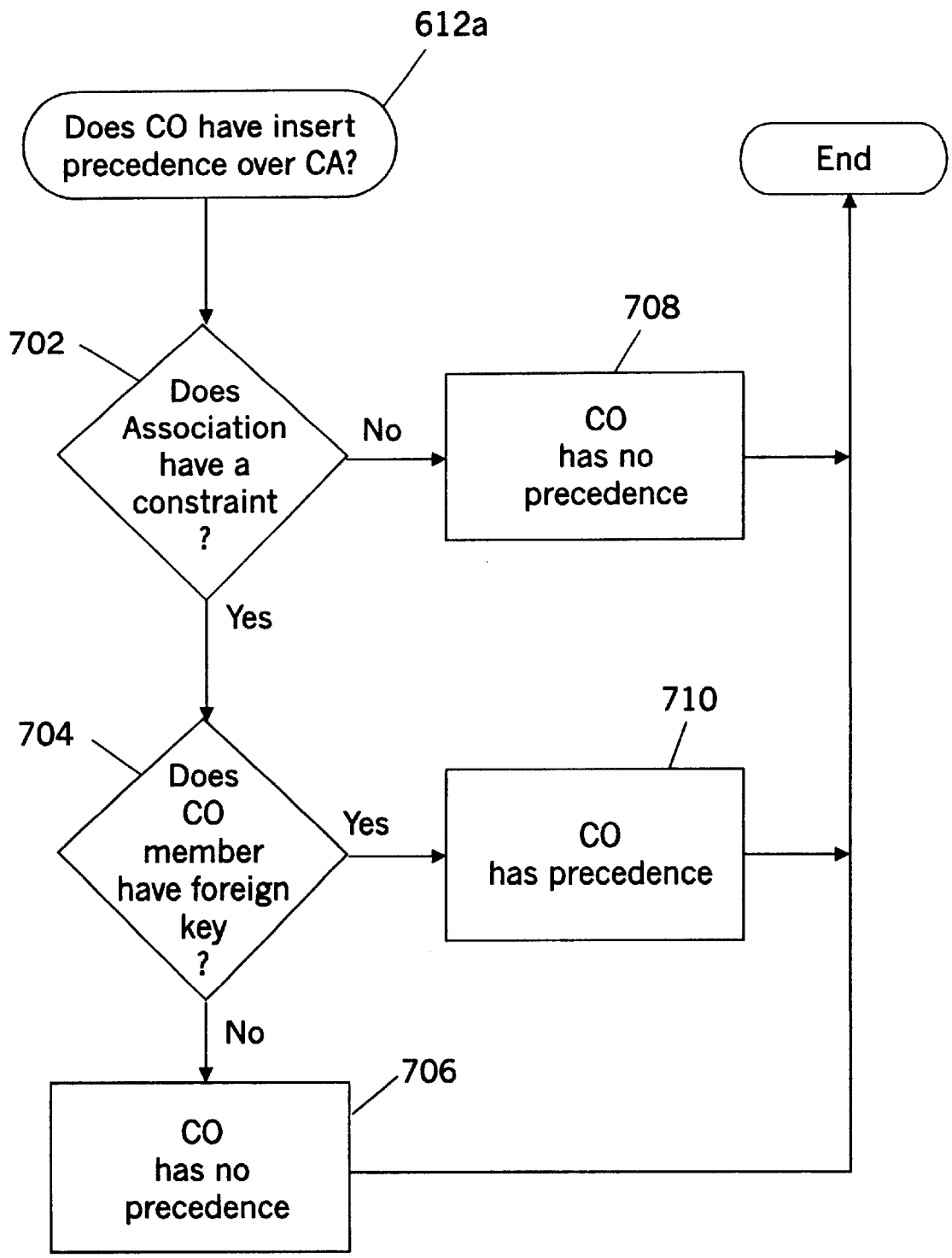
Figure 8:
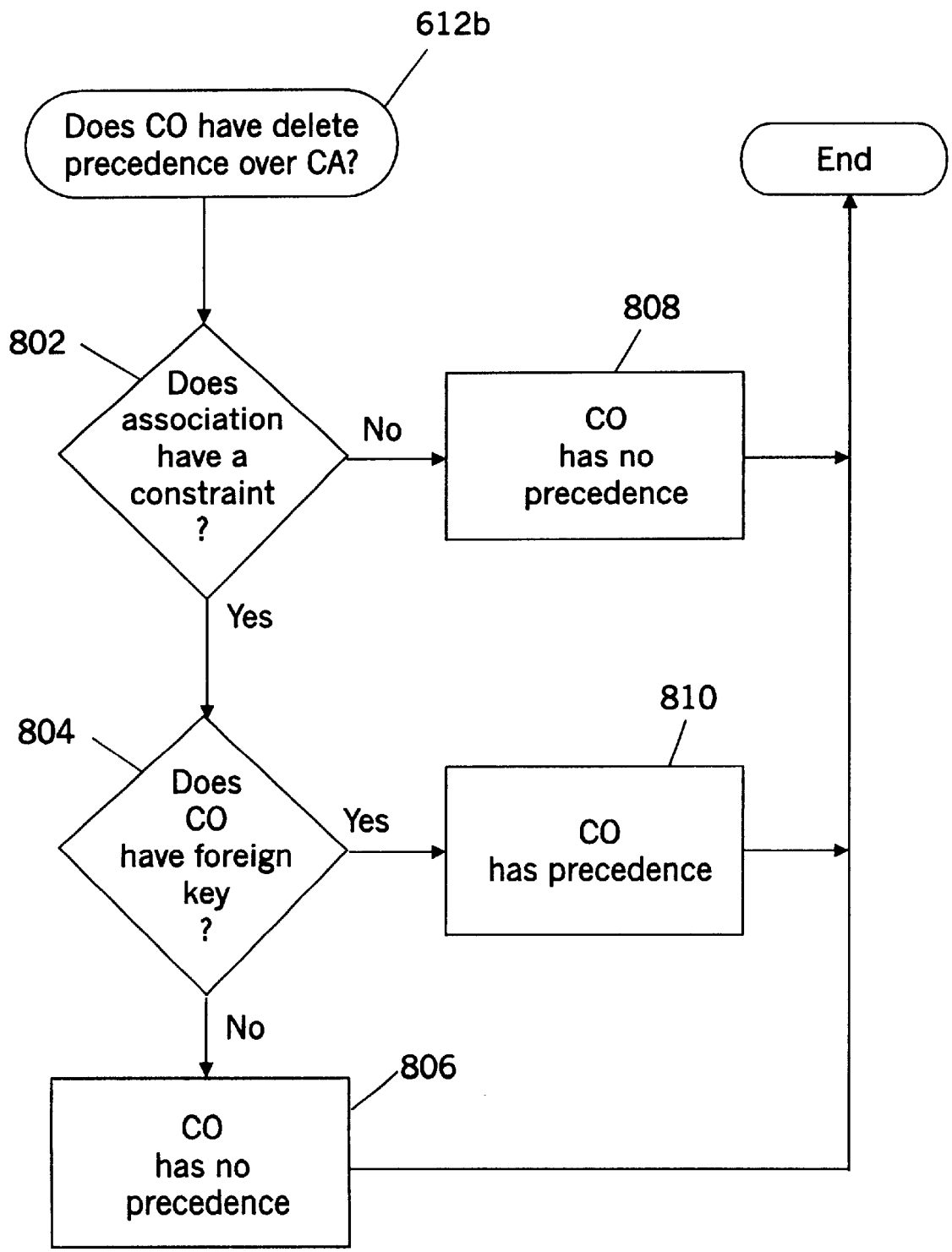

FIGS. 7 and 8 describe detailed operations for determining the insert precedence between an association's Current Object and Associated Objects and for determining the delete precedence between an association's Current Object and Associated Objects, respectively. The operations of FIG. 7 or 8 will be performed depending on whether ordering of objects to be inserted (Block 612a) or deleted (Block 612b) is being performed at Block 612 of FIG. 6.

As shown in FIG. 7, the Current Object has insert precedence over an association if the table holding the Associated Object or objects has a foreign key column, which refers to the primary key column in the table holding the Current Object, and there is a constraint defined for this primary-key/foreign-key column pair. As shown in FIG. 8, the Current Object has delete precedence over an association if the table holding the Current Object as a foreign key column, which refers to the primary key column in the table holding the Associated Object/objects, and there is a constraint defined for this primary-key/foreign-key column pair.

Thus, at Block 702/802 a test is made as to whether an association has a constraint. If no, then at Block 708/808, the Current Object does not have precedence. If yes, then at Block 704, a test is made as to whether the Associated Object has a foreign key and at Block 804, a test is made as to whether the Current Object has a foreign key. If yes, then at Block 710/810, the Current Object has precedence. If not, then at Block 706/806, the Current Object does not have precedence. It will be understood that once the precedence has been determined, many other sorting operations may be performed to order the objects.

Accordingly, associations are used to determine the relative position of objects to be inserted and deleted from a relational database upon completion of a transaction by an object-oriented transaction system. Operation ordering may be performed automatically without the need to generate a custom programming and without the need to artificially constrain usability of the object-oriented transaction processing system.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of ordering database operations that are performed on a relational database upon completion of a transaction by an object-oriented transaction system, the method comprising the steps of:

clustering the objects in the completed transaction into groups of objects to be inserted into the relational database, objects to be deleted from the relational database and objects to be updated in the relational database;

ordering the objects to be inserted into the relational database according to an insert precedence of the objects into the relational database to thereby define an insert order;

ordering the objects to be deleted from the relational database according to a delete precedence of the objects from the relational database to thereby define a delete order;

inserting into the relational database, the objects to be inserted into the relational database, in the insert order; then updating the relational database with the objects to be updated in the relational database; and then deleting from the relational database, the objects to be deleted from the relational database, in the delete order;

wherein the step of ordering the objects to be deleted from the relational database comprises the steps of:

identifying associations among the objects to be deleted;

determining if a current object to be deleted has delete precedence over an associated object to be deleted;

ordering the current object to be deleted ahead of the associated object to be deleted if the current object to be deleted has delete precedence over the associated object to be deleted;

ordering the current object to be deleted behind the associated object to be deleted if the current object to be deleted does not have delete precedence over the associated object to be deleted; and repeatedly performing the steps of determining, ordering ahead and ordering behind, for remaining objects associated with the current object to be deleted.

2. A method according to claim 1 wherein the updating step comprises the step of updating the relational database with the objects to be updated in the relational database, in an arbitrary order.

3. A method according to claim 1 further comprising the step of recursively performing the steps of determining, ordering ahead and ordering behind, for the associated objects of each associated object that is associated with the current object to be deleted that is ordered ahead of the associated object to be deleted.

4. A method according to claim 1:

wherein the step of identifying associations among the objects to be deleted comprises the steps of:

identifying current and associated objects for the objects to be deleted;

identifying foreign keys and primary keys in the objects to be deleted; and identifying constraints in the relational database between pairs of the identified foreign keys and primary keys; and wherein the step of determining if a current object to be deleted has delete precedence over its associated objects to be deleted comprises the steps of:

determining if a foreign key of the current object to be deleted refers to a primary key of the associated object to be deleted;

determining that the current object to be deleted has delete precedence over an associated object to be deleted if there is a constraint identified between the foreign key of the current object to be deleted and the primary key of the associated object to be deleted; and determining that the current object to be deleted does not have delete precedence over an associated object to be deleted if no constraints are identified between the foreign key of the current object to be deleted and the primary key of the associated object to be deleted.

5. A method of ordering database operations that are performed on a relational database upon completion of a transaction by an object-oriented transaction system, the method comprising the steps of:

clustering the objects in the completed transaction into groups of objects to be inserted into the relational database, objects to be deleted from the relational database and objects to be updated in the relational database;

ordering the objects to be inserted into the relational database according to an insert precedence of the objects into the relational database to thereby define an insert order;

ordering the objects to be deleted from the relational database according to a delete precedence of the objects from the relational database to thereby define a delete order;

inserting into the relational database, the objects to be inserted into the relational database, in the insert order; then updating the relational database with the objects to be updated in the relational database; and then deleting from the relational database, the objects to be deleted from the relational database, in the delete order;

wherein the step of ordering the objects to be inserted to the relational database comprises the steps of:

identifying associations among the objects to be inserted;

determining if a current object to be inserted has insert precedence over associated objects to be inserted;

ordering the current object to be inserted ahead of an associated object to be inserted if the current object to be inserted has insert precedence over the associated object to be inserted;

ordering the current object to be inserted behind an associated objects to be inserted if the current object to be inserted does not have insert precedence over an associated objects to be inserted; and repeatedly performing the steps of determining, ordering ahead and ordering behind, for remaining objects associated with the current object to be inserted.

6. A method according to claim 5 further comprising the step of recursively performing the steps of determining, ordering ahead and ordering behind, for the associated objects of each associated object that is associated with the current object to be inserted that is ordered ahead of the associated object to be inserted.

7. A method according to claim 5:

wherein the step of identifying associations among the objects to be inserted comprises the steps of:

identifying current and associated objects for the objects to be inserted;

identifying foreign keys and primary keys in the objects to be inserted; and identifying constraints in the relational database between pairs of the identified foreign keys and primary keys; and wherein the step of determining if a current object to be inserted has insert precedence over its associated objects to be inserted comprises the steps of:
- determining if a foreign key of the associated object to be inserted refers to a primary key of the current object to be inserted;
- determining that the current object to be inserted has insert precedence over an associated object to be inserted if there is a constraint identified between the foreign key of the current object to be inserted and the primary key of the associated object to be inserted; and
- determining that the current object to be inserted does not have insert precedence over an associated object to be inserted if no constraints are identified between the primary key of the current object to be inserted and the foreign key of the associated object to be inserted.

8. A method of ordering objects to be inserted into or deleted from a relational database upon completion of a transaction by an object-oriented transaction system, the method comprising the steps of:
- identifying associations among the objects to be inserted or deleted;
- determining if a current object to be inserted or deleted has insert or delete precedence over an associated object to be inserted or deleted;
- ordering the current object to be inserted or deleted ahead of the associated object to be inserted or deleted if the current object to be inserted or deleted has insert or delete precedence over the associated object to be inserted or deleted;
- ordering the current object to be inserted or deleted behind the associated object to be inserted or deleted if the current object to be inserted or deleted does not have insert or delete precedence over the associated object to be inserted or deleted; and
- repeatedly performing the steps of determining, ordering ahead and ordering behind, for remaining objects associated with the current object to be inserted or deleted.

9. A method according to claim 8 further comprising the step of recursively performing the steps of determining, ordering ahead and ordering behind, for the associated objects of each associated object that is associated with the current object to be inserted or deleted that is ordered ahead of the associated object to be inserted or deleted.

10. A method according to claim 8:
wherein the step of identifying associations among the objects to be inserted or deleted comprises the steps of:
- identifying current and associated objects for the objects to be inserted or deleted;
- identifying foreign keys and primary keys in the objects to be inserted or deleted; and
- identifying constraints in the relational database between pairs of the identified foreign keys and primary keys; and wherein the step of determining if a current object to be inserted or deleted has insert or delete precedence over all associated objects to be inserted or deleted comprises the steps of:
- determining if a foreign key of the associated object to be inserted refers to a primary key of the current object to be inserted;
- determining if a foreign key of the current object to be inserted or deleted refers to a primary key of the associated objects to be deleted;
- determining that the current object to be inserted or deleted has insert or delete precedence over an associated object to be inserted or deleted if there is a constraint identified between the foreign key of the current object to be inserted or deleted and the primary key of the associated object to be inserted or deleted; and
- determining that the current object to be inserted or deleted does not have insert or delete precedence over an associated object to be inserted or deleted if no constraints are identified between the primary key of the current object to be inserted or deleted and the foreign key of the associated object to be inserted or deleted.

11. A data processing system comprising:
a relational database;
an object-oriented transaction system;
means for clustering the objects in the completed transaction into groups of objects to be inserted into the relational database, objects to be deleted from the relational database and objects to be updated in the relational database;
means for ordering the objects to be inserted into the relational database according to an insert precedence of the objects into the relational database to thereby define an insert order;
means for ordering the objects to be deleted from the relational database according to a delete precedence of the objects from the relational database to thereby define a delete order;
means for inserting into the relational database, the objects to be inserted into the relational database, in the insert order;
means for updating the relational database with the objects to be updated in the relational database in response to the means for inserting; and
means for deleting from the relational database, the objects to be deleted from the relational database, in the delete order, in response to the means for updating;
wherein the means for ordering the objects to be deleted from the relational database comprises:
- means for identifying associations among the objects to be deleted;
- means for determining if a current object to be deleted has delete precedence over an associated object to be deleted;
- means for ordering the current object to be deleted ahead of an associated object to be deleted if the current object to be deleted has delete precedence over the associated object to be deleted; and
- means for ordering the current object to be deleted behind an associated object to be deleted if the current object to be deleted does not have delete precedence over the associated object to be deleted.

12. A system according to claim 11 wherein the updating means comprises means for updating the relational database with the objects to be updated in the relational database, in an arbitrary order.

13. A system according to claim 11:
wherein the means for identifying associations among the objects to be deleted comprises:
- means for identifying current and associated objects for the objects to be deleted;
- means for identifying foreign keys and primary keys in the objects to be deleted; and means for identifying constraints in the relational database between pairs of the identified foreign keys and primary keys; and wherein the means for determining if a current object to be deleted has delete precedence over an associated object to be deleted comprises:

means for determining if a foreign key of the current object to be deleted refers to a primary key of the associated object to be deleted;

means for determining that the current object to be deleted has delete precedence over the associated object to be deleted if there is a constraint identified between the foreign key of the current object to be deleted and the primary key of the associated object to be deleted; and means for determining that the current object to be deleted does not have delete precedence over the associated object to be deleted if no constraints are identified between the foreign key of the current object to be deleted and the primary key of the associated object to be deleted.

14. A data processing system comprising:

a relational database;

an object-oriented transaction system;

means for clustering the objects in the completed transaction into groups of objects to be inserted into the relational database, objects to be deleted from the relational database and objects to be updated in the relational database;

means for ordering the objects to be inserted into the relational database according to an insert precedence of the objects into the relational database to thereby define an insert order;

means for ordering the objects to be deleted from the relational database according to a delete precedence of the objects from the relational database to thereby define a delete order;

means for inserting into the relational database, the objects to be inserted into the relational database, in the insert order;

means for updating the relational database with the objects to be updated in the relational database in response to the means for inserting; and means for deleting from the relational database, the objects to be deleted from the relational database, in the delete order, in response to the means for updating;

wherein the means for ordering the objects to be inserted from the relational database comprises:

means for identifying associations among the objects to be inserted;

means for determining if a current object to be inserted has insert precedence over an associated object to be inserted;

means for ordering the current object to be inserted ahead of an associated object to be inserted if the current object to be inserted has insert precedence over the associated object to be inserted; and means for ordering the current object to be inserted behind an associated objects to be inserted if the current object to be inserted does not have insert precedence over the associated object to be inserted.

15. A system according to claim 14:

wherein the means for identifying associations among the objects to be inserted comprises:

means for identifying current and associated objects for the objects to be inserted;

means for identifying foreign keys and primary keys in the objects to be inserted; and means for identifying constraints in the relational database between pairs of the identified foreign keys and primary keys; and wherein the means for determining if a current object to be inserted has insert precedence over an associated object to be inserted comprises:

means for determining if a foreign key of the associated object to be inserted refers to a primary key of the current object to be inserted;

means for determining that the current object to be inserted has insert precedence over an associated objects to be inserted if there is a constraint identified between the foreign key of the current object to be inserted and the primary key of the associated object to be inserted; and means for determining that the current object to be inserted does not have insert precedence over an associated objects to be inserted if no constraints are identified between the primary key of the current object to be inserted and the foreign key of the associated object to be inserted.

16. A data processing system comprising:

relational database;

an object-oriented transaction system;

means for identifying associations among the objects to be inserted or deleted;

means for determining if a current object to be inserted or deleted has insert or delete precedence over an associated object to be inserted or deleted;

means for ordering the current object to be inserted or deleted ahead of an associated object to be inserted or deleted if the current object to be inserted or deleted has insert or delete precedence over the associated object to be inserted or deleted; and means for ordering the current object to be inserted or deleted behind the associated object to be inserted or deleted if the current object to be inserted or deleted does not have insert or delete precedence over the associated object to be inserted or deleted.

17. A system according to claim 16:

wherein the means for identifying associations among the objects to be inserted or deleted comprises:

means for identifying current and associated objects for the objects to be inserted or deleted;

means for identifying foreign keys and primary keys in the objects to be inserted or deleted; and means for identifying constraints in the relational database between pairs of the identified foreign keys and primary keys; and wherein the means for determining if a current object to be inserted or deleted has insert or delete precedence over an associated object to be inserted or deleted comprises:

means for determining if a foreign key of the associated object to be inserted refers to a primary key of the current object to be inserted;

means for determining if a foreign key of the current object to be deleted refers to a primary key of the associated object to be deleted;

means for determining that the current object to be inserted or deleted has insert or delete precedence over the associated object to be inserted or deleted if there is a constraint identified between the foreign key of the current object to be inserted or deleted and the primary key of the associated object to be inserted or deleted; and means for determining that the current object to be inserted or deleted does not have insert or delete precedence over the associated object to be inserted or deleted if no constraints are identified between the foreign key and the primary key of the objects to be inserted or deleted.

18. A computer program product for ordering database operations that are performed on a relational database upon completion of a transaction by an object-oriented transaction system, the computer program product comprising a computer-readable storage medium having computer-readable program code means embodied in the medium, the computer-readable program code means comprising:

computer-readable program code means for clustering the objects in the completed transaction into groups of objects to be inserted into the relational database, objects to be deleted from the relational database and objects to be updated in the relational database;

computer-readable program code means for ordering the objects to be inserted into the relational database according to an insert precedence of the objects into the relational database to thereby define an insert order;

computer-readable program code means for ordering the objects to be deleted from the relational database according to a delete precedence of the objects from the relational database to thereby define a delete order;

computer-readable program code means for inserting into the relational database, the objects to be inserted into the relational database, in the insert order;

computer-readable program code means for updating the relational database with the objects to be updated in the relational database in response to the means for inserting; and computer-readable program code means for deleting from the relational database, the objects to be deleted from the relational database, in the delete order, in response to the means for updating;

wherein the means for ordering the objects to be deleted from the relational database comprises:

computer-readable program code means for identifying associations among the objects to be deleted;

computer-readable program code means for determining if a current object to be deleted has delete precedence over an associated object to be deleted;

computer-readable program code means for ordering the current object to be deleted ahead of the associated object to be deleted if the current object to be deleted has delete precedence over the associated object to be deleted; and computer-readable program code means for ordering the current object to be deleted behind the associated object to be deleted if the current object to be deleted does not have delete precedence over the associated object to be deleted.

19. A computer program product according to claim 18 wherein the updating means comprises computer-readable program code means for updating the relational database with the objects to be updated in the relational database, in an arbitrary order.

20. A computer program product according to claim 18:

wherein the means for identifying associations among the objects to be deleted comprises:

computer-readable program code means for identifying current and associated objects for the objects to be deleted;

computer-readable program code means for identifying foreign keys and primary keys in the objects to be deleted; and computer-readable program code means for identifying constraints in the relational database between pairs of the identified foreign keys and primary keys, and wherein the means for determining if a current object to be deleted has delete precedence over an associated object to be deleted comprises:

computer-readable program code means for determining if a foreign key of the current object to be deleted refers to a primary key of the associated object to be deleted;

computer-readable program code means for determining that the current object to be deleted has delete precedence over the associated object to be deleted if there is a constraint identified between the foreign key of the current object to be deleted and the primary key of the associated object to be deleted; and computer-readable program code means for determining that the current object to be deleted does not have delete precedence over the associated object to be deleted if no constraints are identified between the foreign key of the current object to be deleted and the primary key of the associated object to be deleted.

21. A computer program product for ordering database operations that are performed on a relational database upon completion of a transaction by an object-oriented transaction system, the computer program product comprising a computer-readable storage medium having computer-readable program code means embodied in the medium, the computer-readable program code means comprising:

computer-readable program code means for clustering the objects in the completed transaction into groups of objects to be inserted into the relational database, objects to be deleted from the relational database and objects to be updated in the relational database;

computer-readable program code means for ordering the objects to be inserted into the relational database according to an insert precedence of the objects into the relational database to thereby define an insert order;

computer-readable program code means for ordering the objects to be deleted from the relational database according to a delete precedence of the objects from the relational database to thereby define a delete order;

computer-readable program code means for inserting into the relational database, the objects to be inserted into the relational database, in the insert order;

computer-readable program code means for updating the relational database with the objects to be updated in the relational database in response to the means for inserting; and computer-readable program code means for deleting from the relational database, the objects to be deleted from the relational database, in the delete order, in response to the means for updating;

wherein the means for ordering the objects to be inserted from the relational database comprises:

computer-readable program code means for identifying associations among the objects to be inserted;

computer-readable program code means for determining if a current object to be inserted has insert precedence over an associated object to be inserted;

computer-readable program code means for ordering the current object to be inserted ahead of the associated object to be inserted if the current object to be inserted has insert precedence over the associated object to be inserted; and computer-readable program code means for ordering the current object to be inserted behind the associated object to be inserted if the current object to be inserted does not have insert precedence over the associated object to be inserted.

22. A computer program product according to claim 21:

wherein the means for identifying associations among the objects to be inserted comprises:

computer-readable program code means for identifying current and associated objects for the objects to be inserted;

computer-readable program code means for identifying foreign keys and primary keys in the objects to be inserted; and computer-readable program code means for identifying constraints in the relational database between pairs of the identified foreign keys and primary keys; and wherein the means for determining if a current object to be inserted has insert precedence over all associated objects to be inserted comprises:

computer-readable program code means for determining if a foreign key of the associated object to be inserted refers to a primary key of the current object to be inserted;

computer-readable program code means for determining that the current object to be inserted has insert precedence over the associated object to be inserted if there is a constraint identified between the foreign key of the current object to be inserted and the primary key of the associated object to be inserted; and computer-readable program code means for determining that the current object to be inserted does not have insert precedence over the associated object to be inserted if no constraints are identified between the primary key of the current object to be inserted and the foreign key of the associated object to be inserted.

23. A computer program product for ordering database operations that are performed on a relational database upon completion of a transaction by an object-oriented transaction system, the computer program product comprising a computer-readable storage medium having computer-readable program code means embodied in the medium, the computer-readable program code means comprising:

computer-readable program code means for identifying associations among the objects to be inserted or deleted;

computer-readable program code means for determining if a current object to be inserted or deleted has insert or delete precedence over an associated object to be inserted or deleted;

computer-readable program code means for ordering the current object to be inserted or deleted ahead of the associated object to be inserted or deleted if the current object to be inserted or deleted has insert or delete precedence over the associated object to be inserted or deleted; and computer-readable program code means for ordering the current object to be inserted or deleted behind the associated object to be inserted or deleted if the current object to be inserted or deleted does not have insert or delete precedence over the associated object to be inserted or deleted.

24. A computer program product according to claim 23:

wherein the means for identifying associations among the objects to be inserted or deleted comprises:

computer-readable program code means for identifying current and associated objects in the objects to be inserted or deleted;

computer-readable program code means for identifying foreign keys and primary keys in the objects to be inserted or deleted; and computer-readable program code means for identifying constraints in the relational database between pairs of the identified foreign keys and primary keys; and wherein the means for determining if a current object to be inserted or deleted has insert or delete precedence over an associated object to be inserted or deleted comprises:

computer-readable program code means for determining if a foreign key of the associated object to be inserted or deleted refers to a primary key of the current object to be inserted;

computer-readable program code means for determining if a foreign key of the current object to be deleted refers to a primary key of the associated object to be deleted;

computer-readable program code means for determining that the current object to be inserted or deleted has insert or delete precedence over the associated object to be inserted or deleted if there is a constraint identified between the foreign key of the current object to be inserted or deleted and the primary key of the associated object to be inserted or deleted; and computer-readable program code means for determining that the current object to be inserted or deleted does not have insert or delete precedence over the associated object to be inserted or deleted if no constraints are identified between the foreign key and the primary key of the current and associated objects to be inserted or deleted.

* * * * *